United States Patent [19]

Dieleman

[11] Patent Number: 4,581,750
[45] Date of Patent: Apr. 8, 1986

[54] TRANSMISSION SYSTEM FOR THE TRANSMISSION OF BINARY DATA SYMBOLS

[75] Inventor: Adrianus H. Dieleman, Eindhoven, Netherlands

[73] Assignee: U.S. Philips Corporation, New York, N.Y.

[21] Appl. No.: 501,227

[22] Filed: Jun. 6, 1983

[30] Foreign Application Priority Data

Jun. 9, 1982 [NL] Netherlands ............... 8202319

[51] Int. Cl.$^4$ .................. H04B 15/00; H03M 5/12; H04L 27/00
[52] U.S. Cl. .................. 375/55; 375/18; 375/58; 375/87; 375/103
[58] Field of Search .............. 375/18, 83, 99, 103, 375/58, 87, 55, 80, 101; 360/41, 42, 43

[56] References Cited

U.S. PATENT DOCUMENTS 4,142,065  2/1979  Tannhauser ............... 375/55
4,283,789  8/1981  Monrolin et al. ........... 375/55

OTHER PUBLICATIONS

Lucky, R. W., et al., *Principles of Data Communication*, McGraw-Hill Book Co., New York, 1968.
Hauk, Waldemar et al., "The Calculation of Error Rates for Optical Fiber Systems", IEEE Trans. on Com., vol. COM-26, No. 7, Jul. 1978.

*Primary Examiner*—Marc E. Bookbinder
*Assistant Examiner*—Timothy K. Greer
*Attorney, Agent, or Firm*—Thomas A. Briody; William J. Streeter; Leroy Eason

[57] ABSTRACT

Transmission system for bi-phase modulated signals. Generally receiving filters for these signals will have a frequency response up to twice the bit frequency (twice 1/T) passband. For colored noise whose power increases as the frequency increases this may mean a considerable deterioration of the signal-to-noise ratio compared with the signal-to-noise ratio for unmodulated NRZ-signals. In order to increase the signal-to-noise ratio a receiving filter is used in this case, whose frequency response approximates zero above the bit frequency (1/T) (stopband) and which for lower frequencies is determined such that after filtering a predominantly three-level signal is obtained. The binary data signal can be drived from this signal by rectification and slicing. Use: Optical communication systems.

2 Claims, 7 Drawing Figures

TRANSMISSION SYSTEM FOR THE TRANSMISSION OF BINARY DATA SYMBOLS

BACKGROUND OF THE INVENTION (1) Field of the Invention

The invention relates to a transmission system for the transmission of a bi-phase modulated signal which is divided into T sec. intervals, the waveform in an interval being given by one period of a carrier having the frequency 1/T or of a carrier whose phase is shifted 180° relative thereto, depending on the modulating binary data signal.

The power spectrum of such a bi-phase modulated signal has zero points at 0 Hz and at 2/T and a maximum between 0 Hz and 1/T in the region of 1/T. Bi-phase modulation is inter alia used in cases in which a second signal must be transmitted in addition to a baseband signal. At low frequencies the bi-phase signal contains little energy, as a result of which the transmission of an independent baseband signal is possible at these frequencies.

(2) Description of the Prior Art

By means of bi-phase modulation of the type mentioned here the transmission rate is doubled compared with the original data signal, which is accompanied by an increase of the frequency band which in principle extends from 0 Hz to 2/T. The frequency 1/T is equal to the symbol frequency of the modulating signal and is designated as the bit frequency. The bi-phase modulated signal covers a frequency band having a width of approximately twice the bit frequency.

Generally, a receiving filter for bi-phase modulated signals will be provided by a Nyquist-I filter having a frequency response which continues to twice the bit frequency (passband) and which is zero thereabove (stopband). The transfer function H(w) of such a filter for pulse-shaped signals is, for example, given by:

$$H(w) = \begin{cases} [1 + \cos(wT/4]/2 \text{ for } |w| \leq 4\pi/T \\ 0 \end{cases} \quad (1)$$

(w)=$2\pi f$ is the angular frequency for $|w| > 4\pi/T$.

In the event of white noise such a filter results for bi-phase modulated signals in a signal-to-noise ratio (S/N) which is approximately 9 dB lower than for unmodulated NRZ-signals.

SUMMARY OF THE INVENTION

The invention has for its object to increase the signal-to-noise ratio at the output of the receiving filter in the case in which the power spectrum density of the noise N(w) increases versus the frequency.

According to the invention, the transmission system is characterized in that the means for filterings the bi-phase modulated signal at the receiving side for the case in which the power spectrum density of the noise (N(w)) increases as the frequency increases have a frequency response which for frequencies larger than the frequency 1/T the value zero (stopband) and for the frequencies less than the frequency 1/T is determined such that after filtering a predominantly three-level signal is obtained and that means are present for converting the three-level signal into a binary data signal.

In practice it is then possible for the case in which $N(w)=c.w^2$ to obtain an increase of approximately 3 dB in the signal-to-noise ratio.

It should be noted that from the periodical IEEE Transactions on Communications, Vol. COM-26, No. 7, July 1978, pages 1119–1126 a three-level detection of a bi-phase modulated signal is known, a delayed version (delay T/2 s) of the output signal of the receiving filter, having a Gaussian characteristic, being added to the non-delayed output signal for providing a three-level signal. This article states, that this detection method for white noise results in a power loss of approximately 10.5 dB compared with unmodulated NRZ-signals. The possibility to use this method for colored noise, with an advantageous result for the signal-to-noise ratio is not described in that periodical.

DESCRIPTION OF THE PREFERRED

Figure 1:
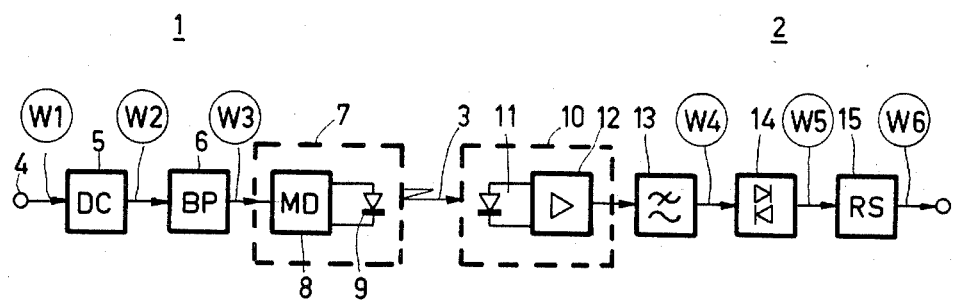
FIG. 1 is a block diagram of a transmission system according to the invention.

The transmission system shown in FIG. 1 has for its object to transmit data from a transmitter 1 to a receiver 2 by means of a transmission medium 3, while using bi-phase modulation, at the carrier frequency 1/T, wherein T is the symbol duration in seconds. In this example the transmission medium 3 is an optical fibre.

The transmitter 1 has an input 4 for receiving a binary data signal of the NRZ-type having symbol intervals of T sec. This signal is differentially encoded in an encoder 5 and is thereafter converted into a bi-phase modulated signal in modulator 6.

The bi-phase modulated signal is applied to an optical transmitter 7, comprising a modulator 8 and a laser diode 9 whose light output is modulated by modulator 8.

Figure 2:
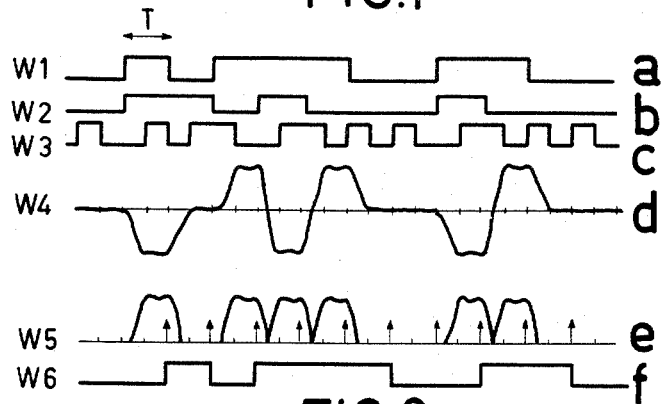
FIGS. 2a–f show waveforms occurring in the system shown in FIG. 1.

The waveforms W1, W2 and W3 occurring at different points in transmitter 1 in the presence of a typical input signal are illustrated in FIGS. 2a–2c.

The receiver 2 comprises an optical receiver 10 which includes a light-sensitive detector diode 11 and a preamplifier 12. A receiving filter 13 is connected to the output of the preamplifier.

Normally, the receiving filter 13 is a Nyquist-I filter having a passband up to the frequency 2/T. By way of illustration FIG. 3a shows the (relative) amplitude spectrum of the bi-phase modulation and FIG. 3b the curve D, the modulus of the transfer function H(w) in accordance with expression (1).

When the optical receiver 10 is formed by a PIN-photo diode 11 in combination with a FET preamplifier 12, then it holds for the noise power that $N(w)=c.w^2$, in which c is a constant.

In accordance with the invention, in the case of colored noise a receiving filter 13 is used which has stopband above the frequency 1/T and between 0 Hz and 1/T has such a shape that a three-level signal is obtained at the output of the receiving filter 13. The waveform W4 of a typical output signal is illustrated in FIG. 2d.

The three-level output signal from receiving filter 13 is subjected to full-wave rectification by rectifier 14. Cf. waveform W5, FIG. 2e. This signal can be converted into a binary data signal by slicing and/or sampling at the sampling moments indicated in FIG. 2e by means of arrows. Cf. the waveform W6, FIG. 2f, at the output of the regenerator 15, which in this example is of the sampling type. This waveform corresponds to the waveform W1 in the transmitter 1 and thus represents the transmitted data.

Possible transfer functions of the receiving filter 13 for pulse-shaped signals which accomplish the object of the invention are the following:

$$A\ Ha(w) = \begin{cases} \cos(wT/4) & \text{for } |w| \leq 2\pi/T \\ 0 & \text{for } |w| > 2/T \end{cases} \quad (2)$$

$$B\ Hb(w) = \begin{cases} j\sin(wT/4) & \text{for } |w| \leq 2\pi/T \\ 0 & \text{for } |w| > 2\pi/T \end{cases} \quad (3)$$

$$C\ Hc(w) = \begin{cases} \tfrac{1}{2}[1 + \cos(wT/2)] & \text{for } |w| \leq 2\pi/T \\ 0 & \text{for } |w| > 2\pi/T \end{cases} \quad (4)$$

Figure 3:
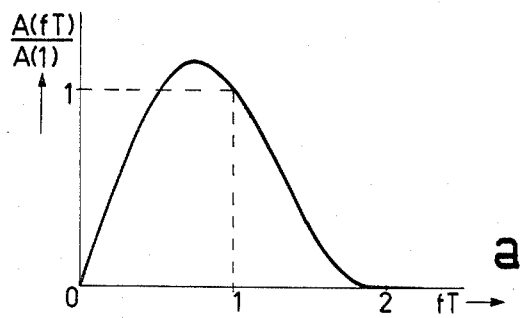
FIG. 3a shows the amplitude spectrum of the bi-phase modulation.
FIG. 3b shows different filter characteristics.
Figure 3:
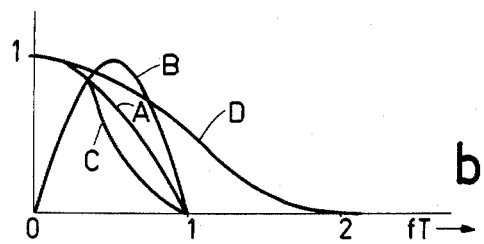
Figure 4A:
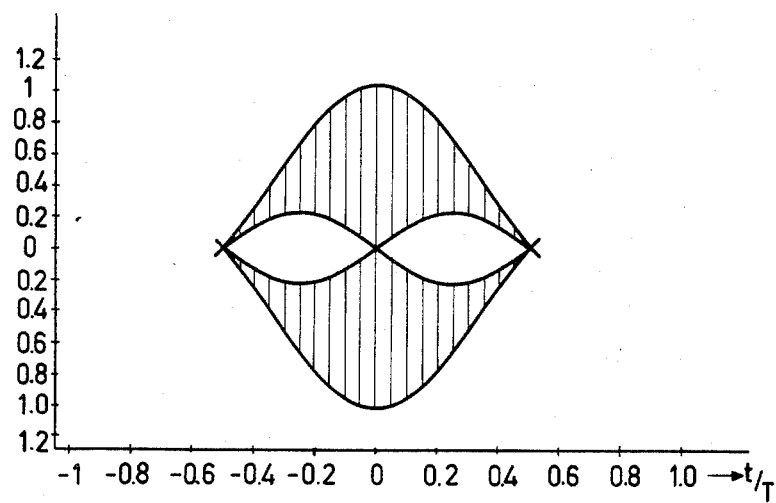
FIGS. 4a–b show eye patterns which are associated with different filter characteristics of the receiving filter.
Figure 4B:
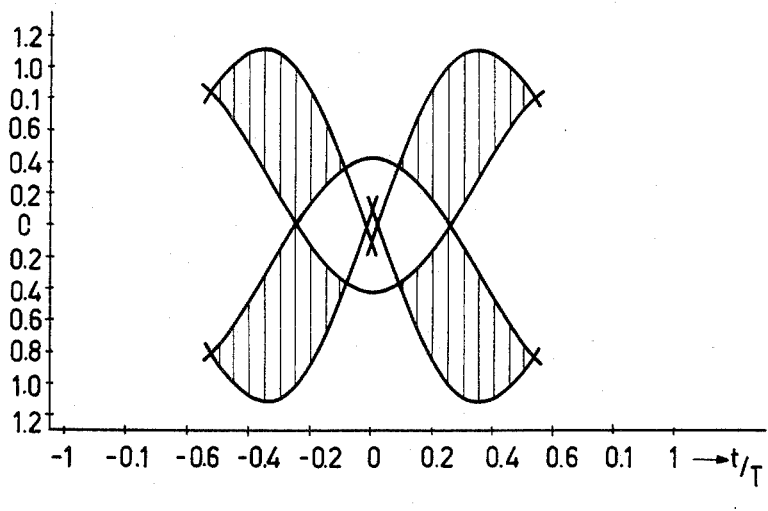
Figure 4C:
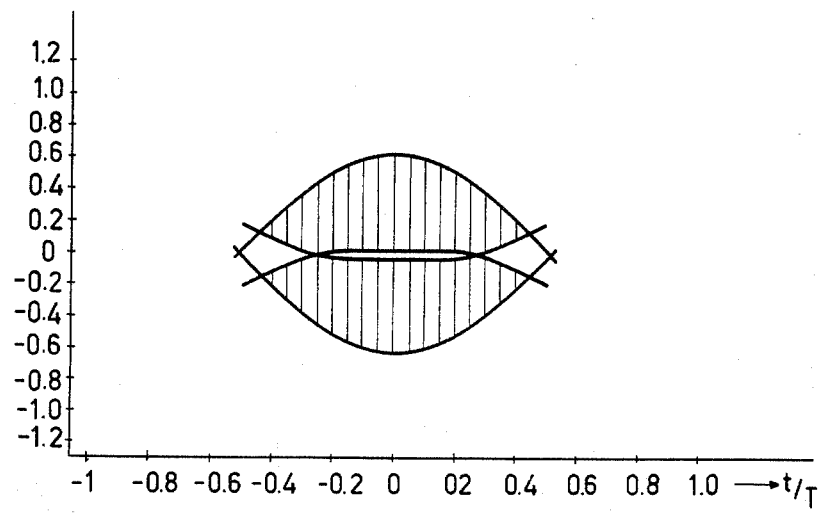

The moduli of these transfer functions are illustrated by the curves A, B and C in FIG. 3. The eye patterns of the output signal of receiving filter 13 are illustrated for the three cases in FIGS. 4a–4c.

It can be demonstrated that with these transfer functions it is possible to obtain for the case in which $N(w) = c.w^2$ an increase of approximately 3 dB in the signal-to-noise ratio, compared with the above-mentioned Nyquist-I receiving filter defined by expression (1).

In practive it has been found that a receiving filter 13 having the transfer function Hc(w) has very advantageous properties because of its low sensitivity to shifts in the sampling instants (clock jitter), which may be positioned at t=0.

Figure 5:
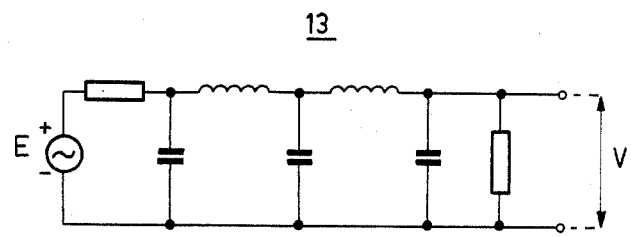
FIG. 5 shows an embodiment of the receiving filter.

FIG. 5 shows an embodiment of the receiving filter 13 for the NRZ-signal shape, considered over half the symbol period (T/2). The values for the components of the filter can be determined by a person skilled in the art in accordance with standard methods in dependence on the required bit rate.

For the filter shown in FIG. 5 it holds for suitably chosen component values that:

$$2|V/E| \approx |Hc(w)\cdot(wT/4/\sin(wT/4)) \quad (5)$$

wherein the factor (wT/4)/sin (wT/4) is the result of the assumed NRZ-signal shape of the input signal E considered over half the symbol period (T/2).

What is claimed is:

1. In a communication system for transmitting a bi-phase modulated signal between a transmitter and a receiver, such bi-phase signal being derived from a binary data signal having a symbol interval of T seconds which modulates first and second carrier waves each of a frequency 1/T, the first and second carrier waves being phase shifted 180° with respect to each other; the improvement characterized in that the receiver of such communication system comprises apparatus for improving the signal-to-noise ratio of the received bi-phase signals with respect to noise having a power spectrum density N(w) which increases with increasing frequency, such apparatus comprising:

means for filtering the bi-phase signals received at said receiver, such filtering means having a sinusoidal frequency transfer function H(w) which approximates zero in response to bi-phase signal frequencies exceeding 1/T and which produces a predominantly three-level output signal in response to bi-phase signal frequencies which do not exceed 1/T;

and means connected to said filtering means for converting the three-level output signal produced thereby into a binary data signal corresponding to said modulating binary data signal.

2. Apparatus as claimed in claim 1, wherein the frequency response transfer function H(w) of said filtering means corresponds to any one of the following mathematical relationships, said relationships being respectively designated as A,B, and C.

$$A\ Ha(w) = \begin{cases} \cos(wT/4) & \text{for } |w| \leq 2\pi/T \\ 0 & \text{for } |w| > 2\pi/T \end{cases}$$

$$B\ Hb(w) = \begin{cases} j\sin(wT/4) & \text{for } |w| \leq 2\pi/T \\ 0 & \text{for } |w| > 2\pi/T \end{cases}$$

$$C\ Hc(w) = \begin{cases} \tfrac{1}{2}[1 + \cos(wT/2)] & \text{for } |w| \leq 2\pi/T \\ 0 & \text{for } |w| > 2\pi/T \end{cases}$$

where $w = 2\pi f$, and f is the bi-phase signal frequency.

* * * * *